US012651985B2

(12) United States Patent
Casler, Jr. et al.

(10) Patent No.: US 12,651,985 B2
(45) Date of Patent: Jun. 9, 2026

(54) ENCODERLESS MOTOR WITH IMPROVED QUANTIZATION AND METHODS OF USE AND CALIBRATION

(71) Applicant: Cepheid, Sunnyvale, CA (US)

(72) Inventors: Richard J. Casler, Jr., Sunnyvale, CA (US); Rajesh Nerkar, Sunnyvale, CA (US); Jeffrey Davis, Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 213 days.

(21) Appl. No.: 18/657,533

(22) Filed: May 7, 2024

(65) Prior Publication Data

US 2024/0372491 A1 Nov. 7, 2024

Related U.S. Application Data

(63) Continuation of application No. 17/575,100, filed on Jan. 13, 2022, now abandoned.

(60) Provisional application No. 63/136,766, filed on Jan. 13, 2021.

(51) Int. Cl.
*H02P 6/16* (2016.01)
(52) U.S. Cl.
CPC ...................................... *H02P 6/16* (2013.01)
(58) Field of Classification Search
CPC ................................. H02P 6/16; G01D 18/001
See application file for complete search history.

(56) References Cited

U.S. PATENT DOCUMENTS

| | | | |
|---|---|---|---|
| 4,562,399 | A | 12/1985 | Fisher |
| 6,218,748 | B1 | 4/2001 | Ushiyama et al. |
| 6,522,130 | B1 | 2/2003 | Lutz |
| 6,791,219 | B1 | 9/2004 | Eric et al. |
| 7,116,100 | B1 | 10/2006 | Mock et al. |

(Continued)

FOREIGN PATENT DOCUMENTS

| | | |
|---|---|---|
| CN | 201860242 | 6/2011 |
| CN | 201860242 U | 6/2011 |

(Continued)

OTHER PUBLICATIONS

Application No. PCT/US2022/012335 , International Search Report and Written Opinion, Mailed on Apr. 20, 2022, 15 pages.

*Primary Examiner* — Cortez M Cook
(74) *Attorney, Agent, or Firm* — Merchant & Gould P.C.

(57) ABSTRACT

A DC electric motor having a stator mounted to a substrate, the stator having a coil assembly having a magnetic core, a rotor mounted to the stator with permanent magnets distributed radially about the rotor, the permanent magnets extending beyond the magnetic core, and sensors mounted to the substrate adjacent the permanent magnets. During operation of the motor passage of the permanent magnets over the sensors produces a substantially sinusoidal signal of varying voltage substantially without noise and/or saturation, allowing an angular position of the rotor to be determined from the sinusoidal signals by utilizing a transformation matrix or piece-wise algorithm applied in substantially linear portions of the sinusoidal signals without requiring use of additional hardware encoder or position sensors and without requiring noise-reduction or filtering of the signal.

24 Claims, 10 Drawing Sheets

(56)  References Cited

U.S. PATENT DOCUMENTS

| | | | |
|---|---|---|---|
| 9,035,582 B2 * | 5/2015 | Yamato .................... H02P 6/10 318/473 | |
| 2003/0057781 A1 | 3/2003 | Shukuri et al. | |
| 2006/0006747 A1 | 1/2006 | Kadowaki | |
| 2006/0016427 A1 | 1/2006 | Uda et al. | |
| 2007/0176568 A1 | 8/2007 | Robichaux et al. | |
| 2009/0292501 A1 | 11/2009 | Bernard et al. | |
| 2009/0315493 A1 | 12/2009 | Hsu | |
| 2015/0048242 A1 | 2/2015 | Remillard et al. | |
| 2015/0137797 A1 | 5/2015 | Ausserlechner et al. | |
| 2015/0295525 A1 | 10/2015 | Liu et al. | |
| 2017/0025974 A1 | 1/2017 | Phan et al. | |
| 2017/0222582 A1 | 8/2017 | Suzuki et al. | |
| 2018/0080797 A1 * | 3/2018 | Roos .................... G01D 18/001 | |
| 2019/0052214 A1 | 2/2019 | Sumita et al. | |
| 2019/0229600 A1 | 7/2019 | Woo et al. | |
| 2021/0257943 A1 | 8/2021 | Phan | |

FOREIGN PATENT DOCUMENTS

| | | | |
|---|---|---|---|
| CN | 110199201 A | 9/2019 |
| CN | 111051819 A | 4/2020 |
| CN | 111051819 B | 9/2022 |
| EP | 1974227 A2 | 10/2008 |
| EP | 1974227 B1 | 9/2012 |
| EP | 3780352 A1 | 2/2021 |
| EP | 4075100 A1 | 10/2022 |
| JP | 04208090 A | 7/1992 |
| JP | 404208090 A | 7/1992 |
| JP | 2005172441 A | 6/2005 |
| JP | 2005177904 A | 7/2005 |
| JP | 4625027 B2 | 2/2011 |
| JP | 2015114209 A | 6/2015 |
| JP | 5767917 | 8/2015 |
| JP | 5767917 B2 | 8/2015 |
| WO | 2005076860 A2 | 8/2005 |
| WO | 2007075041 A1 | 7/2007 |
| WO | 2016140032 A1 | 9/2016 |
| WO | 2017064767 A1 | 4/2017 |
| WO | 2018143973 A1 | 8/2018 |
| WO | 2019177603 A1 | 9/2019 |
| WO | 2019199056 A1 | 10/2019 |

* cited by examiner

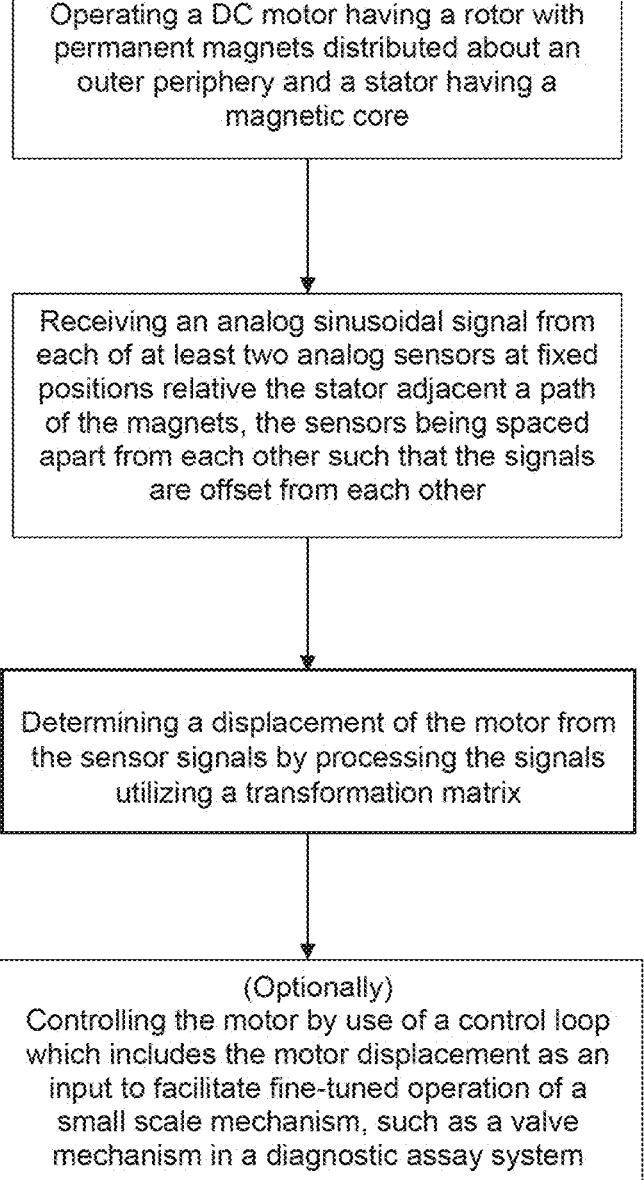

Operating a DC motor having a rotor with permanent magnets distributed about an outer periphery and a stator having a magnetic core Receiving an analog sinusoidal signal from each of at least two analog sensors at fixed positions relative the stator adjacent a path of the magnets, the sensors being spaced apart from each other such that the signals are offset from each other Determining a displacement of the motor from the sensor signals by processing the signals utilizing a transformation matrix (Optionally)
Controlling the motor by use of a control loop which includes the motor displacement as an input to facilitate fine-tuned operation of a small scale mechanism, such as a valve mechanism in a diagnostic assay system

FIG. 9

ENCODERLESS MOTOR WITH IMPROVED QUANTIZATION AND METHODS OF USE AND CALIBRATION

CROSS-REFERENCES TO RELATED APPLICATIONS

This application is a Continuation of U.S. application Ser. No. 17/575,100, filed Jan. 13, 2022, which claims the benefit of priority of U.S. Provisional Application No. 63/136,766 filed on Jan. 13, 2021, the entire contents of which are incorporated herein by reference.

STATEMENT AS TO RIGHTS TO INVENTIONS MADE UNDER FEDERALLY SPONSORED RESEARCH AND DEVELOPMENT

This invention was made with U.S. Government support under Agreement No. W15QKN-16-9-1002 awarded by the ACC-NJ to the MCDC. The Government has certain rights in the invention.

BACKGROUND OF THE INVENTION

The present invention relates to the field of electric motors, in particular brushless DC electric motors, and pertains to commutation and encoding for such motors.

This application is generally related to: U.S. Pat. No. 10,348,225 entitled "Encoderless Motor with Improved Granularity and Methods of Use" issued Jul. 9, 2019; U.S. application Ser. No. 15/217,893 entitled "Molecular Diagnostic Assay System" filed Jul. 22, 2016; U.S. patent application Ser. No. 13/843,739 entitled "Honeycomb tube," filed on Mar. 15, 2013; U.S. Pat. No. 8,048,386 entitled "Fluid Processing and Control," filed Feb. 25, 2002; U.S. Pat. No. 6,374,684 entitled "Fluid Control and Processing System," filed Aug. 25, 2000; each of which is incorporated herein by reference in its entirety for all purposes.

BRIEF SUMMARY OF THE INVENTION

In one aspect, the invention provides system and methods for encoding a brushless DC electric motor in a manner that produces extraordinarily high resolution and positional accuracy without requiring use of any additional encoder hardware as taught herein. The same system and methods can also provide for commutation of the motor. In some embodiments, the system allows for encoding of a brushless DC motor without use of a hardware encoder or additional positional sensors and without requiring any noise-filtering of a measured voltage signal.

In some embodiments, the invention provides a motor system that includes a stator comprising a magnetic core, a movable element (e.g. linear stage, rotor that is rotatably mounted relative to the stator) having a plurality of permanent magnets distributed therein), and multiple voltage sensors at fixed positions relative the stator and disposed adjacent a path of the plurality of magnets during movement of the movable element. The system further includes a processor module communicatively coupled with the multiple sensors and configured to determine a displacement of the motor from the voltage signals from the sensors without requiring use of a hardware encoder or additional position-based sensor and/or without error correction of the signal. In some embodiments having a rotatable rotor, the plurality of magnets extend a distance (e.g. about 1 mm or greater)

beyond the magnetic core of the stator such that the signal from the sensors is substantially without noise.

In some embodiments, the system includes a processing module configured to: receive a measured voltage signal from each of the sensors during rotation of the rotor, the signal being a substantially sinusoidal signal of varying voltage during rotation of the rotor; and determine a displacement of the motor from the sinusoidal signals from the sensors. In some embodiments, the processing module is configured to process the signals from at least two sensors by utilizing a matrix transformation from which the motor displacement (e.g. angular displacement of rotor) is determined. Advantageously, utilizing matrix transformation from the signals of at least two sensors that eliminates electrical cycle harmonics that may arise from piece-wise applied algorithms that may adversely affect the accuracy of a signal from an individual sensor so as to provide increased resolution and quantization and reduced runout—the difference between the actual and the determined displacement— for determination of motor displacement.

In some embodiments, the system includes a DC electric motor having a stator mounted to a substrate and a rotor mounted to the stator. The stator includes a coil assembly having a core and electrical windings, the coil assembly having an outside diameter, a proximal extremity, and a distal extremity. The rotor includes permanent magnets disposed along an outer edge (e.g. mounted to a cylindrical skirt), the rotor having an outside diameter, an inside diameter, and a distal edge. In some embodiments, the permanent magnets extend beyond the distal extremity of the magnetic core of the stator (i.e. the coil assembly). The system further includes multiple sensors mounted to the substrate adjacent the permanent magnets. While the sensors are mounted to the substrate in this embodiment, it is appreciated that the sensors could be mounted to any support or element that is adjacent to the magnets of the movable element (e.g. rotor, translator) and that remains stationary with the stator. In some embodiments, the rotor is fabricated using a series of separate permanent magnets arranged in a pattern of alternating opposite polarity of the adjacent magnets at the distal edge of the skirt. In some embodiments, the rotor is defined as a single piece of magnetic material (e.g. a ferromagnetic or ferrimagnetic material) in the shape of a strip, a ring or a disk, that is then magnetized to create the pattern of alternating opposite magnetic polarity at the distal edge of the skirt. Both fabrication methods are suitable for use with the invention. In some embodiments, the core is a core of magnetic material, typically a metal or other paramagnetic material. Non-limiting exemplary materials suitable for use in the core of the instant invention include iron, especially soft iron, cobalt, nickel, silicon, laminated silicon steel, silicon alloys, special alloys (e.g. mu-metal, permalloy, supermalloy, sendust), and amorphous metals (e.g. metglas). The core may also include air, and in some embodiments, the core is an air core. During operation of the motor, passage of the permanent magnets over the sensors produces a substantially sinusoidal signal of varying voltage substantially without noise and/or saturation, thereby allowing an angular position of the rotor relative the substrate to be determined from the sinusoidal signal without requiring use of encoder hardware or positional sensors. Thus, displacement of the motor can be determined and controlled with a high degree of accuracy and resolution. For example, a motor as described herein comprising 12 permanent magnets and 9 poles and using 3 Halls sensors and an 11-bit analog to digital converter as a processing module can deliver a resolution of about 0.01 degrees mechanical rotation, without use of any encoder hardware or positional sensors or noise filtering. The resolution and accuracy of the system can be increased or decreased by changing the number of poles, the number of permanent magnets, or using a higher or lower bit ADC.

In some embodiments, the multiple sensors mounted are positioned relative to the extended edge of the permanent magnets. The multiple sensors can be mounted on the substrate that the movable element is mounted to or can be mounted to a stationary support element that remains stationary with the stator while the movable element (e.g. translator, rotor) moves. The position is defined such that a clearance from the extended edge of the permanent magnets to the multiple sensors is sufficient to provide a DC voltage signal substantially without noise and/or saturation. In some embodiments, the edge of the permanent magnets extends beyond the distal extremity of the coil assembly by about 100 microns. In some embodiments, the permanent magnets extend beyond the distal extremity of the coil assembly by less than 100 microns, e.g., 90, 80, 70, 60, 50, 40, 30, 20, 10 microns or less, depending on the particular embodiments of the motor. In some embodiments, the permanent magnets extend beyond the distal extremity of the coil assembly by more than 100 microns, for example, 200, 300, 400, 500, 600, 700, 800, 900, 1000 microns, including all values between about 100 microns and 1000 microns, or more depending on the particular embodiments of the motor. In some embodiments, the permanent magnets extend beyond the distal extremity of the coil assembly by about 1 mm or more, including but not limited to about 1 mm, 2 mm, 3 mm, 4 mm, 5 mm, 6 mm, 7 mm, 8 mm, 9 mm, 10 mm, or more. The exact distance that the permanent magnet extends beyond the distal extremity of the coil assembly depends on the particular characteristics and embodiments of the motor, and is well within the skill of an ordinary artisan to determine based on the guidance provided herein. In some embodiments, the one or more sensors are linear Hall-effect sensors, spaced apart by a common arc length along an arcuate path of the rotor.

In one aspect, the invention pertains to an n-phase encoder for use in a mechatronic system. Such encoders can be utilized in a BLDC motor configured for operation of a mechatronic system or sub-assembly, such as within a diagnostic assay system. The mechatronic system for a diagnostic assay system can include any of: a syringe, valve, cartridge loading or door mechanism. In some embodiments, the encoder system can include: a movable element that applies a magnetic field with period, S, the period representing a total displacement in the coordinate frame of the movable element; and a stationary support with n magnetic field sensors mounted thereon and positioned on the stationary support so as to measure the magnetic field imparted by the movable element, wherein n is greater than 1. In some embodiments, the encoder includes a processor communicatively coupled to the n magnetic field sensors and configured to determine displacement of the movable element based on n signals from the n magnetic field sensors by processing the n signals utilizing a transformation matrix. Typically, the total displacement is $2\pi$ radians of a field angle $\phi$. In some embodiments, the processor is configured to process the n signals from the n sensors by: computing the sine and cosine of the field angle, $\phi$, by pre-multiplying the n-by-1 vector by a 2-by-n mathematical transformation matrix, M; and computing the field angle, $\phi$, as $\phi=\tan-1$ $(\sin(\phi),\cos(\phi))$. The period S can be a rotary displacement or a linear displacement.

In some embodiments, the mathematical transformation, M, is configured such that calculation of the field angle, $\phi$, is independent of an amplitude and bias of the magnetic field sensors. One of the advantages of the implementations described herein is that the encoder is insensitive to the common-mode amplitude and bias in the n signals, the term "common-mode" referring to the "mean" of the signal attributes. Preferably, the magnetic field sensors are uniformly distributed within the period, S. In some embodiments, the system is configured such that the applied magnetic field is represented by a sum of first and at least one of higher-order harmonics. This provides that the position/displacement can be derived even if there are higher-order harmonics in the signals. In some embodiments, the processor is configured to store a runout represented by a spatially-varying signal representing the difference between the true field angle and the sensed field angle and utilizes the runout to compensate for the difference so as to remove a runout error. It can be advantageous to calibrate the runout function and subtract the known error by storing this from a prior calibration or in-situ self-test prior to operating the system. In some embodiments, the runout can be specified as a linear sum of sine and cosine of harmonics of S. This may improve accuracy in operation of the mechatronic system (e.g. syringe mechanism in aspirating and dispensing).

In another aspect, the invention pertains to methods of determining displacement utilizing an encoder as described above. Such methods can includes: providing an n phase encoder of mechatronic system that includes a movable element that applies a magnetic field with period, S, the period representing a total displacement within the coordinate frame of the movable element, and a stationary support with n magnetic field sensors mounted thereon and positioned on the stationary support so as to measure the magnetic field imparted by the movable element, wherein n is greater than 1; obtaining signals from the n magnetic field sensors corresponding to the measurements of the magnetic field imparted by the movable element; and processing n signals from the n magnetic field sensors by utilizing a transformation matrix to determine a displacement of the movable element. The displacement S can be rotary or linear. Typically, the total displacement is $2\pi$ radians of a field angle $\phi$. In some embodiments, processing the signals comprises: computing the sine and cosine of the field angle, $\phi$, by pre-multiplying the n-by-1 vector by a 2-by-n mathematical transformation matrix, M; and computing the field angle, $\phi$, as $\phi=\tan-1(\sin(\phi),\cos(\phi))$.

In some embodiments, processing of the multiple signals can include normalizing an amplitude of at least one of the signals from the n magnetic field sensors to an arbitrary value. In some embodiments, processing can further include subtracting the signal bias of at least one of the signals from the n magnetic field sensors before the normalization operation. In some embodiments, the system and methods include determining one or more signal bias coefficients. In some embodiments, the processing further includes storing in memory or outputting to the mechatronic system, the signal bias coefficients. These additional aspects of signal processing can be advantageous in the case where the n sensors have uneven amplitude and bias, so as to compensate for any phase-to-phase differences in amplitude and bias.

In another aspect, the invention pertains to a method of calibrating the encoder described above. Such calibration methods can include storing any or all of: a signal amplitude, a bias, and a phase-shift of the sensors. In some embodiments, the calibration method includes computing the signal amplitude, bias and phase-shift of the n sensors and storing in a memory of the software encoder or the mechatronic system in which it is employed. In some embodiments, the calibration method includes computing the signal amplitude, bias and a matrix transformation that incorporates the 2-by-n mathematical transformation matrix, $M(\phi)$, specific to the calibrated phase-to-phase angles, $\phi$, in the mechatronic system. These additional aspects of signal processing can be advantageous in the case where the n sensors are irregularly spaced in relation to a nominal phase relationship as might arise in component placement and soldering during mechatronic system fabrication.

In yet another aspect, the encoder approach can be modified for a multi-speed mechatronic system. Such an encoder system can include: a movable element that applies at least two of a spatially-varying field, a first applying a field of period, S1 and a second, S2 where S2 is an integer multiple of the period, S1; and a stationary support having n1 sensors arranged within the period S1 and n2 sensors arranged within the period S2, where n1 and n2 are each greater than or equal to two, the sensors being configured to measure the magnetic field of the movable element. The system can further include a processor that obtains the signals from the sensors and applies a transformation matrix to determine field angles, $\phi1$ and $\phi2$. In some embodiments, the processor is configured to: process n1 and n2 sensor signals from the n1 and n2 sensors; apply a mathematical transformation to compute sine and cosine of the field angles, $\phi1$ and $\phi2$, respectively; and compute $\phi2$ with substantially equivalent resolution to $\phi1$. The above described approaches can also be utilized with various other encoding approaches as well.

BRIEF DESCRIPTION OF THE DRAWINGS

FIG. 9 illustrates a method of determining displacement of a motor during operation in accordance with some embodiments of the invention.

DETAILED DESCRIPTION OF THE INVENTION

Figure 1:
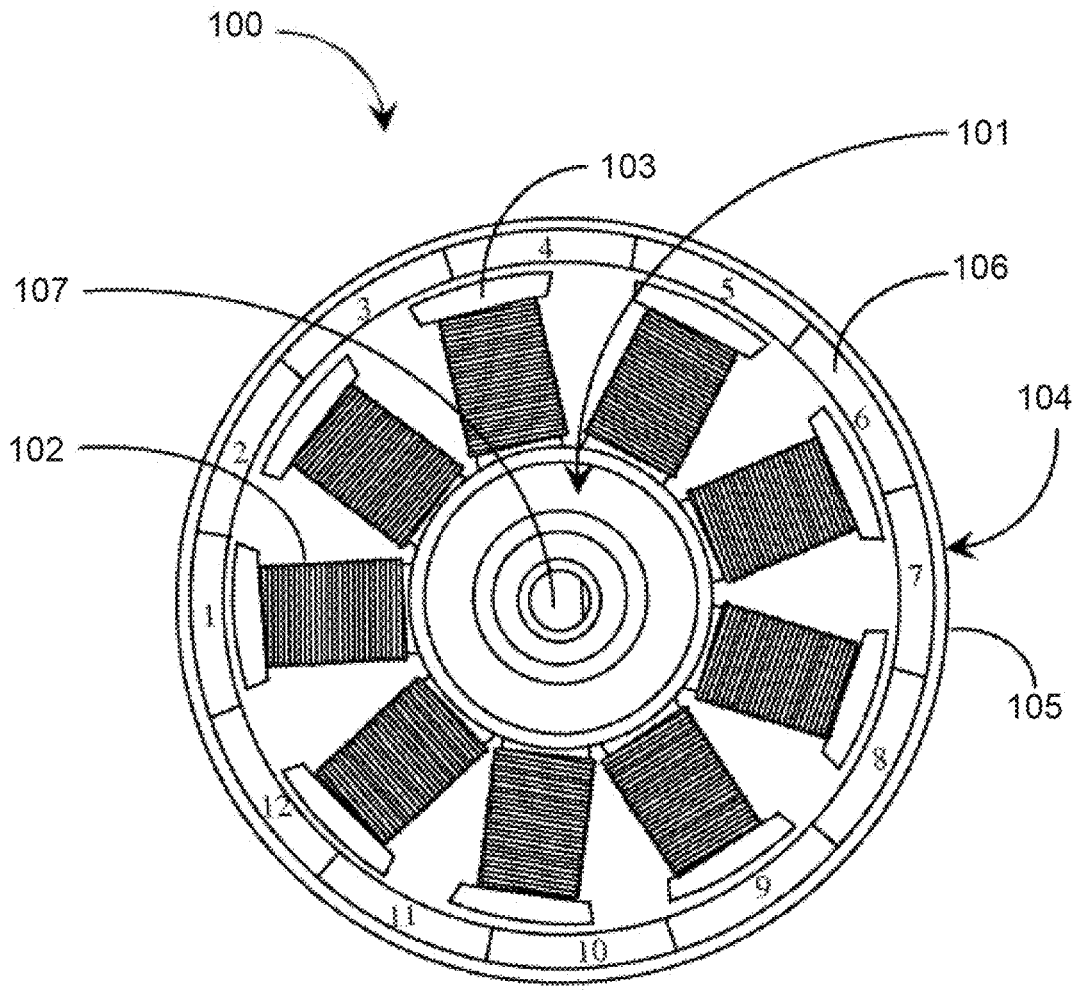
FIG. 1 is a plan view diagram illustrating elements of a brushless DC electric motor in an exemplary embodiment of the present invention.

FIG. 1 is a plan view diagram illustrating elements of a brushless DC (BLDC) electric motor 100 in a non-limiting exemplary prototype. It is appreciated that such a motor could be used in a wide variety of applications, and is of particular use for operation of a small-scale mechanical mechanism requiring a high level of accuracy and quantization. Some embodiments include a motor system having improved resolution in the determination of motor displacement without use of hardware encoders and/or noise-filtering, for example, a resolution of about 0.1 degrees of mechanical rotation, or preferably about 0.01 degrees mechanical rotation, or even about 0.001 degrees of mechanical rotation or less. One such application is operation of a syringe drive to effect highly precise fluid metering, or operation of a valve assembly of a diagnostic assay system that interfaces with a sample cartridge in order to facilitate a complex sample processing and/or analysis procedure upon fine-tuned movement of the valve assembly. Examples of such applications can be found in U.S. Pat. No. 10,562,030 entitled "Molecular Diagnostic Assay System" and U.S. Pat. No. 8,048,386 entitled "Fluid Processing and Control," filed Feb. 25, 2002; U.S. Pat. No. 6,374,684 entitled "Fluid Control and Processing System," filed Aug. 25, 2000, the entire contents of which are incorporated herein by reference.

In one aspect, the BLDC motor includes a rotor, a stator, and multiple analog voltage sensors configured to produce a smoothly varying Hall-effect voltage without any need for filtering or noise reduction of the individual signals. In some embodiments, this feature is provided by use of permanent magnets within the rotor that extend a distance beyond the magnetic core of the stator. In some embodiments, the BLDC motor includes as many analog voltage sensors as phases of the motor, which are positioned such that the motor can be controlled based on the measured voltage patterns received from the sensors. In one aspect, the voltage signals from the sensors are processed utilizing a transformation matrix, thereby avoiding any inaccuracies that might otherwise arise from algorithms applied in a piecewise method. In some embodiments, this includes spacing the sensors radially uniformly about the stator such that the measured voltage waveforms are offset uniformly. For example, a three-phase BLDC can include three Hall-effect sensors spaced 40 degrees radially from each other, thereby allowing the system to control a position of the sensor within an increment of 40 degrees. The signals from the sensors can be used to determine the displacement of the motor with a high degree of accuracy. When utilized individually, although each signal is substantially free from noise and/or saturation, a velocity ripple or other motor harmonic arising from the piecewise method may adversely affect displacement determinations based on a single sensor signal. A velocity ripple describes cyclical variations or oscillations of rotational speed over time in comparison to the actual speed or displacement. Therefore, to overcome any adverse effects attributable to a velocity ripple on an individual signal, the control methods can obtain and process multiple signals from the distributed sensors to determine a given displacement of the motor. In some embodiments, a processor communicatively coupled to the motor is configured to obtain and process the signals from the multiple sensors by application of a mathematical transformation matrix (e.g. for three sensors a 2×3 transformation matrix) so as to determine the motor displacement with a high level of accuracy despite the presence of any velocity ripple affecting an individual signal.

As described herein, the sensor and processor configuration provides for highly accurate determination of motor displacement from multiple sensor signals that detect the magnetic field of the permanent magnets that also effect movement of the movable element (e.g. translator, rotor). Although this configuration is referred to herein as an "encoder", this concept is distinguishable from conventional hardware encoders or additional position-based sensors that require additional encoder hardware on the motor (e.g. additional optical, electrical, or magnetic features on the shaft or rotor dedicated to encoding). Thus, the "encoder" described in further detail below is greatly simplified as compared to a conventional hardware encoder since it only requires sensing of existing magnets in the system. This provides for improved integration within the motor design and associated control unit as it does not require any additional encoder hardware or additional position-based detection components beyond the sensors noted below. It is further noted that the encoder described herein, allows for accurate determination from the sensor signals without filtering, noise filtering, or error correction of individual signals and without iteration or recursive solutions.

In one aspect, the encoder in accordance with the present invention is used to effect movement of a mechatronic sub-assembly. In a preferred embodiment, the encoder is utilized in a small-scale motor or mechatronic system within a diagnostic assay system, for example, a syringe, valve, cartridge loading or door mechanism, or other mechatronic sub-assembly. In the embodiments described below, the encoder is a multi-phase encoder corresponding to the number of phases of the motor that it encodes. Although a three-phase motor is described in the following examples, it is appreciated that the concepts described herein could be applied to any multi-phase motor configuration.

For a three-phase encoder, the system can include: a movable element (e.g. rotor, linear stage) that applies a magnetic field with period, S, the period representing a displacement of $2\pi$ radians of a field angle, $\varphi$; a stationary element with 3 magnetic field sensors (e.g. Hall-effect sensors) configured to measure the magnetic field imparted by permanent magnets of the movable element; and a processor (e.g. microprocessor, control unit) that is configured to obtain the signals from the three sensors and to process the signals from the three by: (a) computing the sine and cosine of the field angle, $\varphi$, by pre-multiplying the 3-by-1 vector by a 2-by-3 mathematical transformation matrix, M; and (b) computing the field angle $\varphi$, as $\varphi$=tan−1 (sin ($\varphi$), cos($\varphi$)). The following equations can be used for implementation of this integrated sensor encoder approach for three sensors placed $2\pi/3$ radians apart.

$$\begin{bmatrix} hs1 \\ hs2 \\ hs3 \end{bmatrix} = V_A * \begin{bmatrix} \sin(\varphi) \\ \sin\left(\varphi + \dfrac{2\pi}{3}\right) \\ \sin\left(\varphi + \dfrac{4\pi}{3}\right) \end{bmatrix} \quad \text{where, } hs1 = \text{hall sensor 1} \\ hs2 = \text{hall sensor 2} \\ hs3 = \text{hall sensor 3} \qquad \text{eqn (1)}$$

-continued $$\begin{bmatrix} hs1 \\ hs2 \\ hs3 \end{bmatrix} = V_A * \begin{bmatrix} \sin(\varphi) \\ \sin(\varphi)\cos\left(\dfrac{2\pi}{3}\right) + \cos(\varphi)\sin\left(\dfrac{2\pi}{3}\right) \\ \sin(\varphi)\cos\left(\dfrac{4\pi}{3}\right) + \cos(\varphi)\sin\left(\dfrac{4\pi}{3}\right) \end{bmatrix} \qquad \text{eqn (2)}$$

$$\begin{bmatrix} hs1 \\ hs2 \\ hs3 \end{bmatrix} = V_A * \begin{bmatrix} 1 & 0 \\ \cos\left(\dfrac{2\pi}{3}\right) & \sin\left(\dfrac{2\pi}{3}\right) \\ \cos\left(\dfrac{4\pi}{3}\right) & \sin\left(\dfrac{4\pi}{3}\right) \end{bmatrix} * \begin{bmatrix} \sin(\varphi) \\ \cos(\varphi) \end{bmatrix} \qquad \text{eqn (4)}$$

$$\begin{bmatrix} hs1 \\ hs2 \\ hs3 \end{bmatrix} = V_A * \begin{bmatrix} 1 & 0 \\ \left(\dfrac{-1}{2}\right) & \left(\dfrac{\sqrt{3}}{2}\right) \\ \left(\dfrac{-1}{2}\right) & \left(\dfrac{-\sqrt{3}}{2}\right) \end{bmatrix} * \begin{bmatrix} \sin(\varphi) \\ \cos(\varphi) \end{bmatrix} \qquad \text{eqn (5)}$$

$$\begin{bmatrix} hs1 \\ hs2 \\ hs3 \end{bmatrix} = V_A * A * \begin{bmatrix} \sin(\varphi) \\ \cos(\varphi) \end{bmatrix} \qquad \text{eqn (6)}$$

$$\begin{bmatrix} \sin(\varphi) \\ \cos(\varphi) \end{bmatrix} = \dfrac{1}{V_A} * (A^T A)^{-1} A^T * \begin{bmatrix} hs1 \\ hs2 \\ hs3 \end{bmatrix} \qquad \text{eqn (7)}$$

$$\begin{bmatrix} \sin(\varphi) \\ \cos(\varphi) \end{bmatrix} = \dfrac{1}{V_A} * \begin{bmatrix} \dfrac{2}{3} & \dfrac{-1}{3} & \dfrac{-1}{3} \\ 0 & \dfrac{\sqrt{3}}{3} & \dfrac{-\sqrt{3}}{3} \end{bmatrix} * \begin{bmatrix} hs1 \\ hs2 \\ hs3 \end{bmatrix} \qquad \text{eqn (8)}$$

The matrix M in equation (8) can then be computed using the phase difference of $2\pi/3$ radians between sensor signals.

$$\begin{bmatrix} \sin(\varphi) \\ \cos(\varphi) \end{bmatrix} = \dfrac{1}{V_A} * M * \begin{bmatrix} hs1 \\ hs2 \\ hs3 \end{bmatrix} \qquad \text{eqn (9)}$$

$$\varphi = \tan^{-1}(\sin(\varphi), \cos(\varphi)) \qquad \text{eqn (10)}$$

In another aspect, the sensors can be calibrated for magnitude, offset and phase, by modifying equation (1). This phase calibration will compute a new M matrix in equation (8).

$$\begin{bmatrix} m_1 \cdot hs1 + off_1 \\ m_2 \cdot hs2 + off_2 \\ m_3 \cdot hs3 + off_3 \end{bmatrix} = V_A * \begin{bmatrix} \sin(\varphi) \\ \sin\left(\varphi + \left(\dfrac{2\pi}{3} + \phi_1\right)\right) \\ \sin\left(\varphi + \left(\dfrac{4\pi}{3} + \phi_2\right)\right) \end{bmatrix}$$

It is appreciated that the above is an example implementation of this approach applied to a three-phase encoder, as described herein, and that this same approach could be adjusted and utilized for encoding of any multi-phase system or motor or even a multi-speed motor.

In the foregoing specification, the invention is described with reference to specific embodiments thereof, but those skilled in the art will recognize that the invention is not limited thereto. As used throughout, the term "about" can refer to the ±10% of the recited value. Various features and aspects of the above-described invention can be used individually or jointly. It is appreciated that any of the aspects or features of the embodiments described herein could be modified, combined or incorporated into any of the embodiments described herein, as well as in various other types and configurations. Further, the invention can be utilized in any number of environments and applications beyond those described herein without departing from the broader spirit and scope of the specification. The specification and drawings are, accordingly, to be regarded as illustrative rather than restrictive.

In some embodiments, such as that shown in FIG. 1, the motor includes an internal stator assembly 101 having nine pole teeth extending radially from center, each pole tooth ending in a pole shoe 103, and each pole tooth having a winding providing an electromagnetic coil 102. The motor further includes an external rotor 104 having an external cylindrical skirt 105 and twelve permanent magnets 106 arranged with alternating polarity around the inner periphery of the skirt 105. The permanent magnets are shaped to provide a cylindrical inner surface for the rotor with close proximity to outer curved surfaces of the pole shoes. The BLDC motor in this example is a three-phase, twelve pole motor. Controls provided, but not shown in FIG. 1, switch current in the coils 102 providing electromagnetic interaction with permanent magnets 106 to drive the rotor, as would be known to one of skill in the art. While an internal stator and external rotor are described here, it is appreciated that this approach can also be used in a motor having an internal rotor and external stator, or a linear motor as well.

It should be noted that the number of pole teeth and poles, and indeed the disclosure of an internal stator and an external rotor are exemplary, and not limiting in the invention, which is operable with motors of a variety of different designs.

Figure 2A:
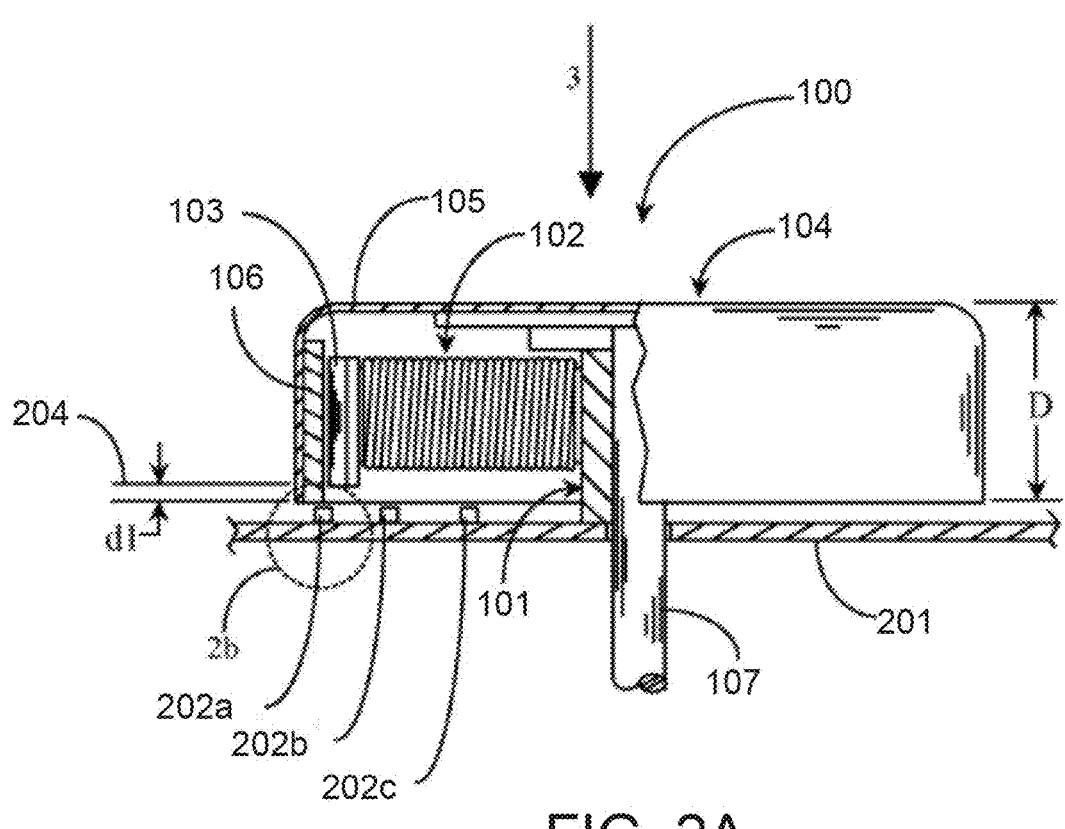
FIG. 2A is a side elevation view, partly in section, of the motor depicted in FIG. 1, mounted on a substrate.

FIG. 2A is a side elevation view, partly in section, of the motor of FIG. 1, cut away to show one pole tooth and coil of the nine, ending in pole shoe 103 in close proximity to one of the twelve permanent magnets 106 arranged around the inner periphery of cylindrical skirt 105 of external rotor 104. The pole teeth and pole shoes of stator assembly 101 are a part of the core, and define a distal extremity of the core at the height of line 204. Stator assembly 101 is supported in this implementation on a substrate 201, which in some embodiments is a printed circuit board (PCB), which can include a control unit and traces configured for managing switching of electrical current to coils 102 so as to provide electromagnetic fields interacting with the fields of permanent magnets 106 to drive the rotor. The PCB substrate can also include control circuitry for encoding and commutation. Rotor 104 engages physically with stator 101 by drive shaft 107, which engages a bearing assembly in the stator to guide the rotor with precision in rotation. Details of bearings are not shown in FIG. 2A, although it is appreciated that there are many conventional ways such bearings can be implemented. Drive shaft 107 in this implementation passes through an opening for the purpose in PCB 201 and can be engaged to drive mechanical devices.

Three linear Hall-effect sensors 202a, 202b and 202c are illustrated in FIG. 2A, supported by PCB 201, and positioned strategically according to some embodiments so as to produce variable voltage signals that may be used in a process to encode and provide commutation for motor 100. In FIG. 2A the overall height of skirt 105 of rotor 104 is represented by dimension D. Dimension d1 represents extension of the distal extremity of the rotor magnets below the distal extremity of the magnetic core at line 204. In some embodiments, the direction of this extension is transverse, typically perpendicular, to the plane along which the rotor rotates.

Figure 2B:
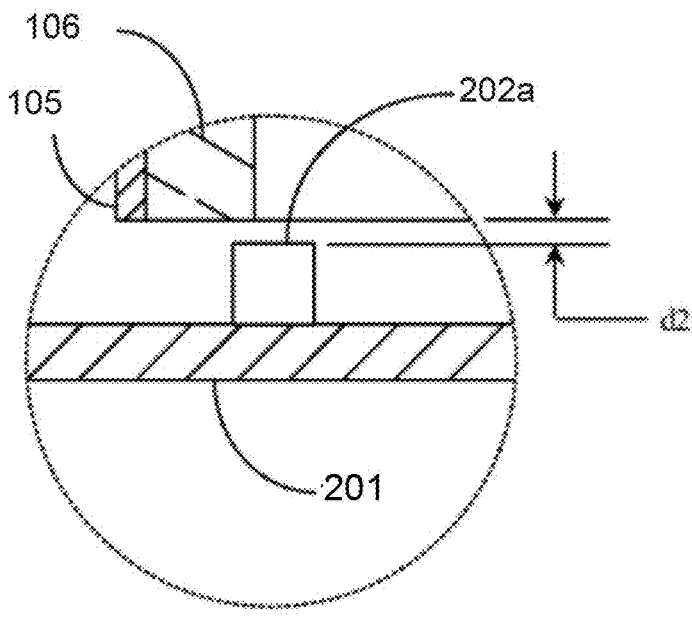
FIG. 2B is a magnified elevation view of area 2b of FIG. 2A, illustrating spacing between magnets and sensors in an exemplary embodiment of the invention.

FIG. 2B is a magnified elevation view of area 2b of FIG. 2A illustrating clearance d2 between the distal edge of the permanent magnets of rotor 104 and the structural bodies of the Hall-effect sensors 202a, 202b and 202c on PCB 201.

Figure 3A:
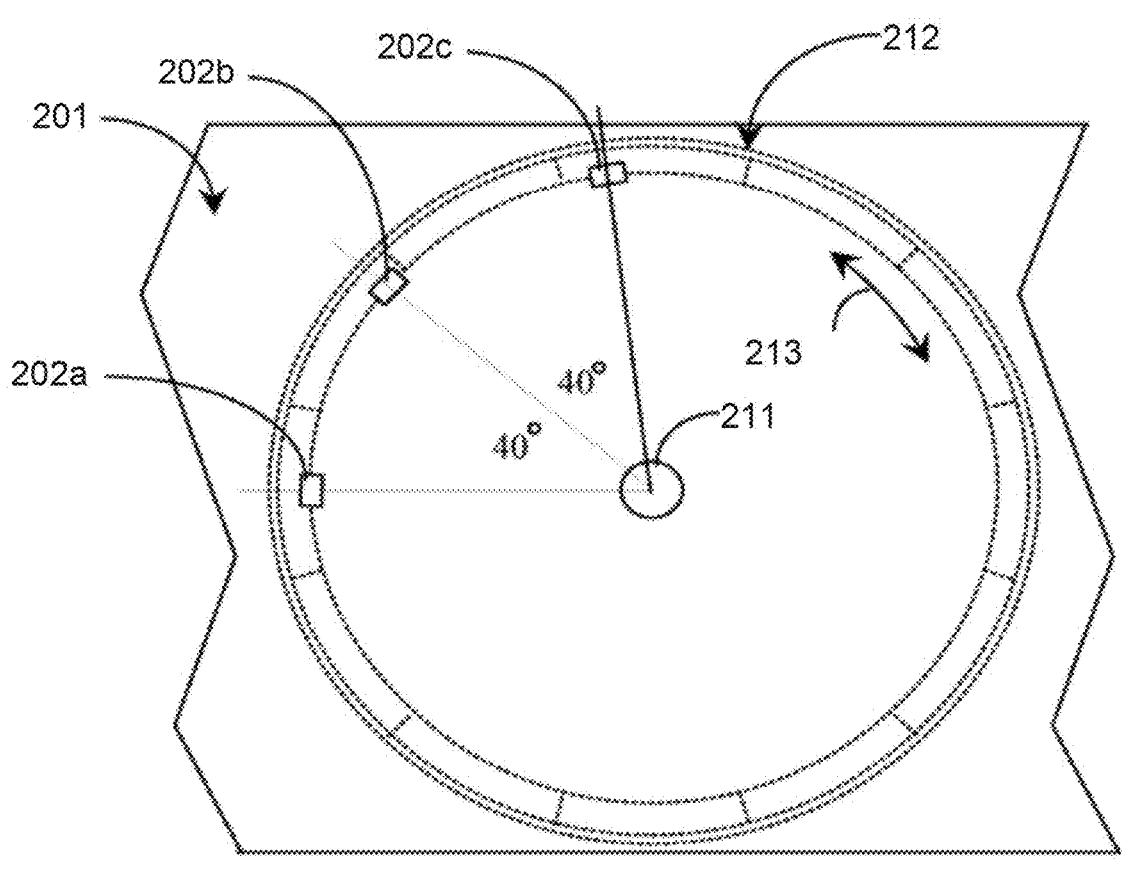
FIG. 3A is a plan view of the substrate of FIG. 2B with the motor removed, illustrating placement of sensors in an exemplary embodiment of the invention.

FIG. 3A is a plan diagram of a portion of PCB 201 taken in the direction of arrow 3 of FIG. 2A, showing placement of Hall-effect sensors 202a, 202b and 202c relative to the distal edge of rotor 104, which may be seen in FIG. 2 to extend below the distal edge of the core by dimension d. In FIG. 3 the rotation track of rotor 104 including the twelve permanent magnets 106 is shown in dotted outline 212. The rotor rotates in either direction 213 about the rotational center 211 depending on details of commutation. It is appreciated that the approaches described herein can be used regardless of the direction of rotation of the rotor.

As illustrated in this non-limiting exemplary prototype, each of Hall-effect sensors 202a, 202b and 202c is positioned beneath the distal edge of the rotor magnets, just toward the inside, radially, of the central track of the rotating magnets. Hall-effect sensor 202b is located to be forty degrees arc from Hall-effect sensor 202a along the rotating track of the magnets of the rotor. Similarly, Hall-effect sensor 202c is located a further forty degrees around the rotor track from Hall-effect sensor 202b.

Figure 3B:
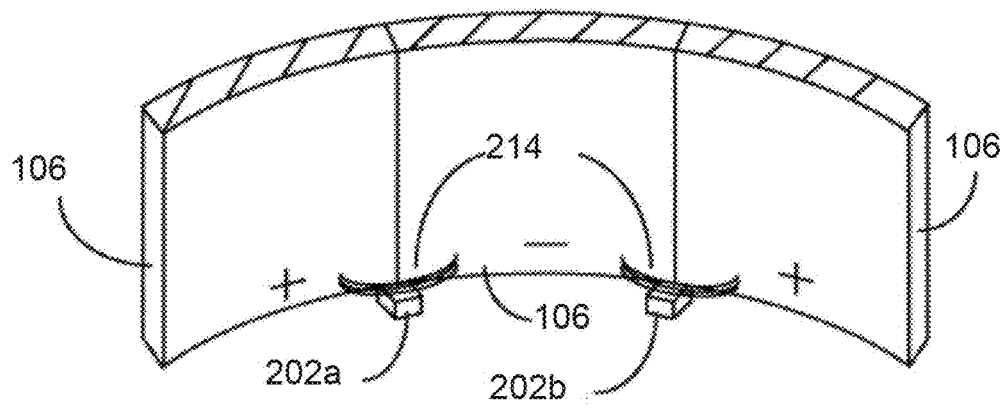
FIG. 3B illustrates the placement of the permanent magnets in the rotor in a pattern of alternating polarity at the distal edge, and showing the fringing fields of the adjacent permanent magnets according to an exemplary embodiment of the invention.

FIG. 3B is a perspective view of three of the permanent magnets 106 in relation to two of the Hall-effect sensors 202a and 202b in this non-limiting exemplary prototype. The permanent magnets in the rotor are placed with alternating polarity as shown in FIG. 3B, and at the distal edge of the rotor fringing fields 214 are exhibited between adjacent permanent magnets. It is these fringing fields between adjacent permanent magnets that the analog sensors (e.g. Hall-effect sensors) are placed and spaced to sense the fringing fields, and the curved aspect of the inner surfaces of the permanent magnets dictate the placement of the Hall-effect sensors somewhat to the inside, radially, of the central track of the magnets in rotation. The Hall-effect sensors can be placed inside by a small distance, such as 1 mm or more (e.g. 2, 3, 4 mm) depending on the overall size of the device and the strength of the magnetic fields being dictated. It is advantageous for the space between the sensors and the permanent magnets (i.e. d2) to be minimized in order to substantially eliminate noise in the detection signal. Similarly, in a linear motor the sensors can be mounted on an support element that extends between the magnetic core of the stator and the permanent magnets along the movable element (e.g. linear stage) such that a space between the sensors and the magnets is less than the space between the magnetic core of the stator and the magnets, thereby substantially eliminating noise from the signal. Alternatively, in a linear motor the sensors can be mounted on a movable stage that extends between the magnetic core of the stage and the permanent magnets along the stationary element such that a space between the sensors and the magnets is less than the space between the magnetic core of the stage and the magnets, thereby substantially eliminating noise from the signal.

Referring back to FIG. 2A, dimension d1 refers to an extension distance of the distal extremity of the rotor magnets below the distal extremity of the core at line 204. In conventional motors, there is no reason or motivation to extend this edge below the extremity of the core, particularly since this can increase the height of the motor and require increased clearance between the rotor and substrate. In fact, the skilled artisan would limit dimension D so there is no such extension, as the added dimension would only add unnecessary cost and bulk to a conventional motor. Further-more, in conventional motors at the distal extremity of the rotor, at the height of or above the distal extremity of the core, switching of current in coils 102 creates a considerable field effect, and a signal from a Hall-effect sensor placed to sense permanent magnets at that position would not produce a smoothly varying Hall-effect voltage. Rather, the effect in a conventional motor is substantially noise corrupted. The conventional approach to this dilemma is to introduce noise-filtering, or more commonly to utilize a hardware encoder.

Advantageously, extending the rotor magnets below the distal extremity of the iron core avoids the corrupting effect of the switching fields from the coils of the stator on the signal from the Hall-effect sensors. The particular extension d1 will depend on several factors specific to the particular motor arrangement, and in some embodiments will be 1 mm or more (e.g. 2 mm, 3 mm, 4 mm, 5 mm, 6 mm, or greater), while in some other embodiments the extension will be less than 1 mm. In some embodiments, the distance is a function of the size of the permanent magnets and/or the strength of the magnetic field. In some embodiments of the exemplary prototype as detailed herein, 1 mm of extension is sufficient to produce a sinusoidal signal of varying voltage without noise or saturation. Placement of the Hall-effect sensors at a separation d2 to produce a Hall-effect voltage produces a smoothly variable voltage, devoid of noise. In some embodiments, the Hall-effect sensors produce a smoothly variable DC voltage in the range from about 2 volts to about 5 volts devoid of noise or saturation. The dimension d2 may vary depending on choice of sensor, design of a rotor, strength of permanent magnets in the rotor, and other factors that are well known to persons of skill in the art. A workable separation is readily discovered for any particular circumstance, to avoid saturation of the sensor and to produce a smoothly variable DC voltage substantially devoid of noise.

Figure 4:
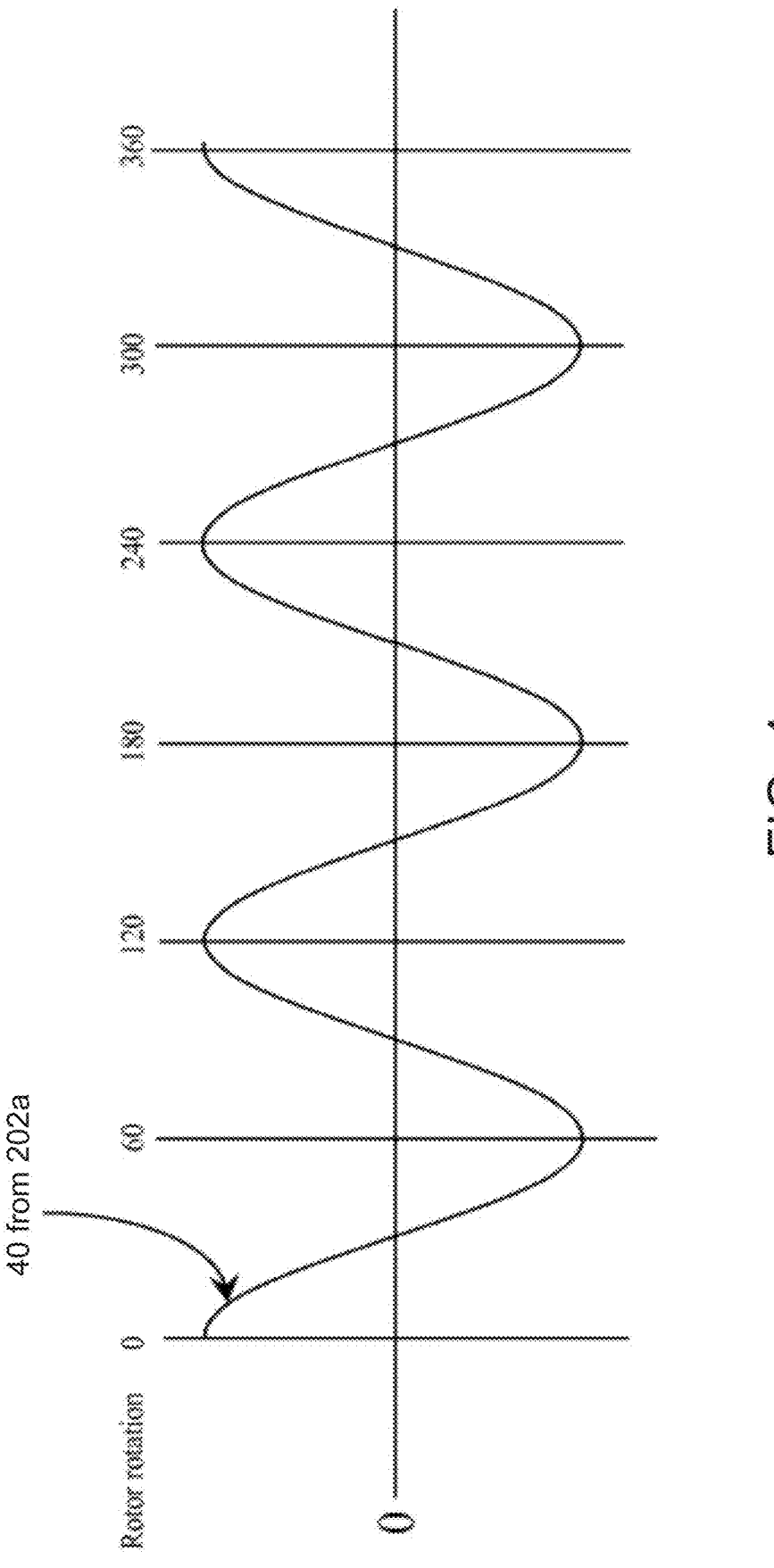
FIG. 4 illustrates an essentially sinusoidal variable voltage pattern produced by passage of permanent magnets of a motor rotor over a first Hall-effect sensor in an exemplary embodiment of the invention.

FIG. 4 illustrates a sinusoidal variable voltage pattern 40 produced by passage of permanent magnets 106 of rotor 104 over Hall-effect sensor 202a in a three-phase BLDC motor. The 0 degree starting point is arbitrarily set to be at a maximum voltage point. Three complete sine waveforms are produced in one full 360 degree revolution of the rotor.

Figure 5:
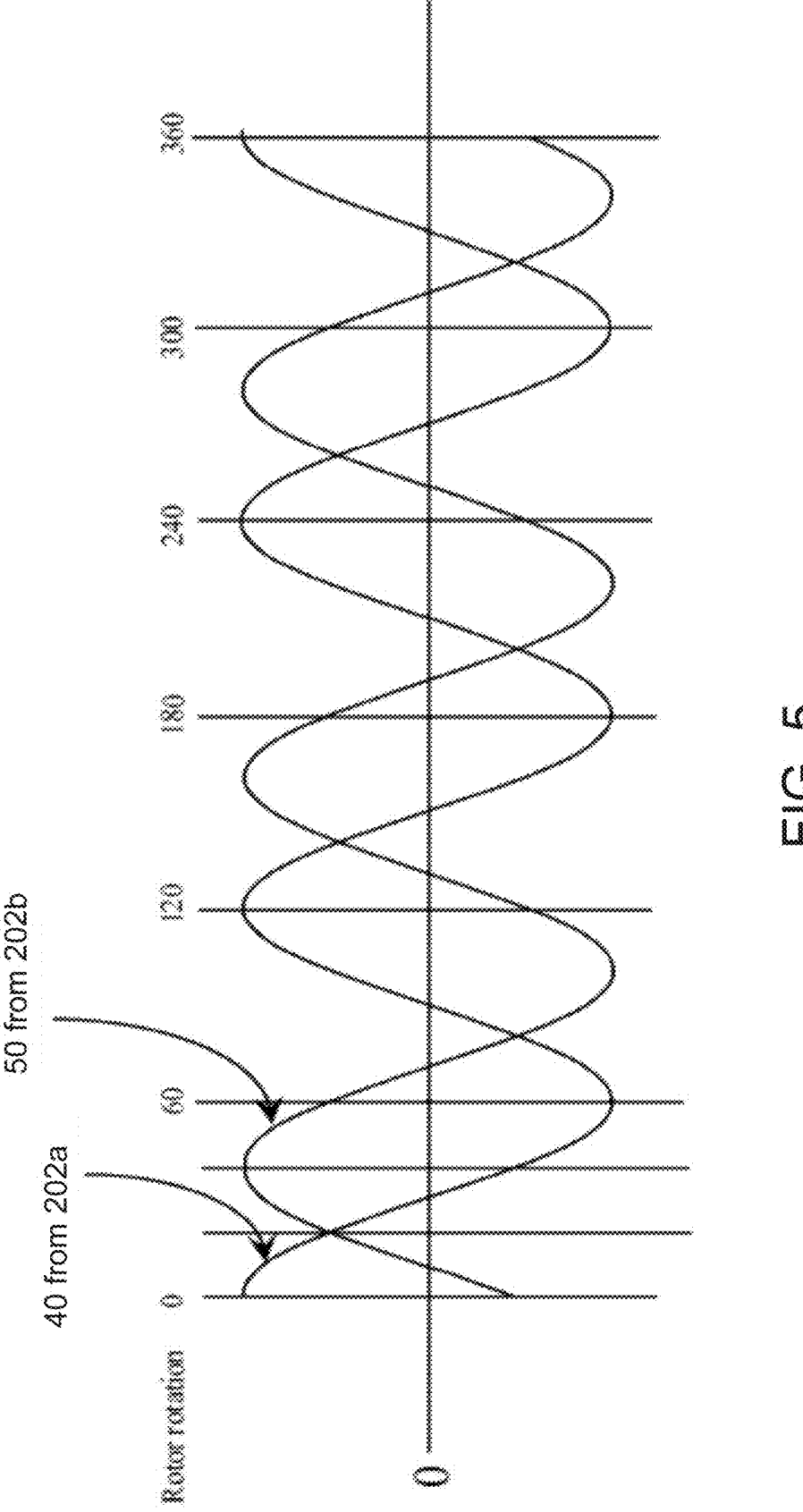
FIG. 5 illustrates a sinusoidal variable voltage pattern produced by passage of permanent magnets of a rotor over a second Hall-effect sensor, the pattern superimposed over the pattern of FIG. 4.

FIG. 5 illustrates a substantially noise free sinusoidal variable voltage pattern 50 produced by passage of permanent magnets 106 of rotor 104 over Hall-effect sensor 202b, with the 50 pattern superimposed over the 40 pattern of FIG. 4. As Hall-effect sensor 202b is positioned at an arc length of 40 degrees from the position of Hall-effect sensor 202a, sinusoidal pattern 50 is phase-shifted by 20 degrees from that of sinusoidal pattern 40.

Figure 6:
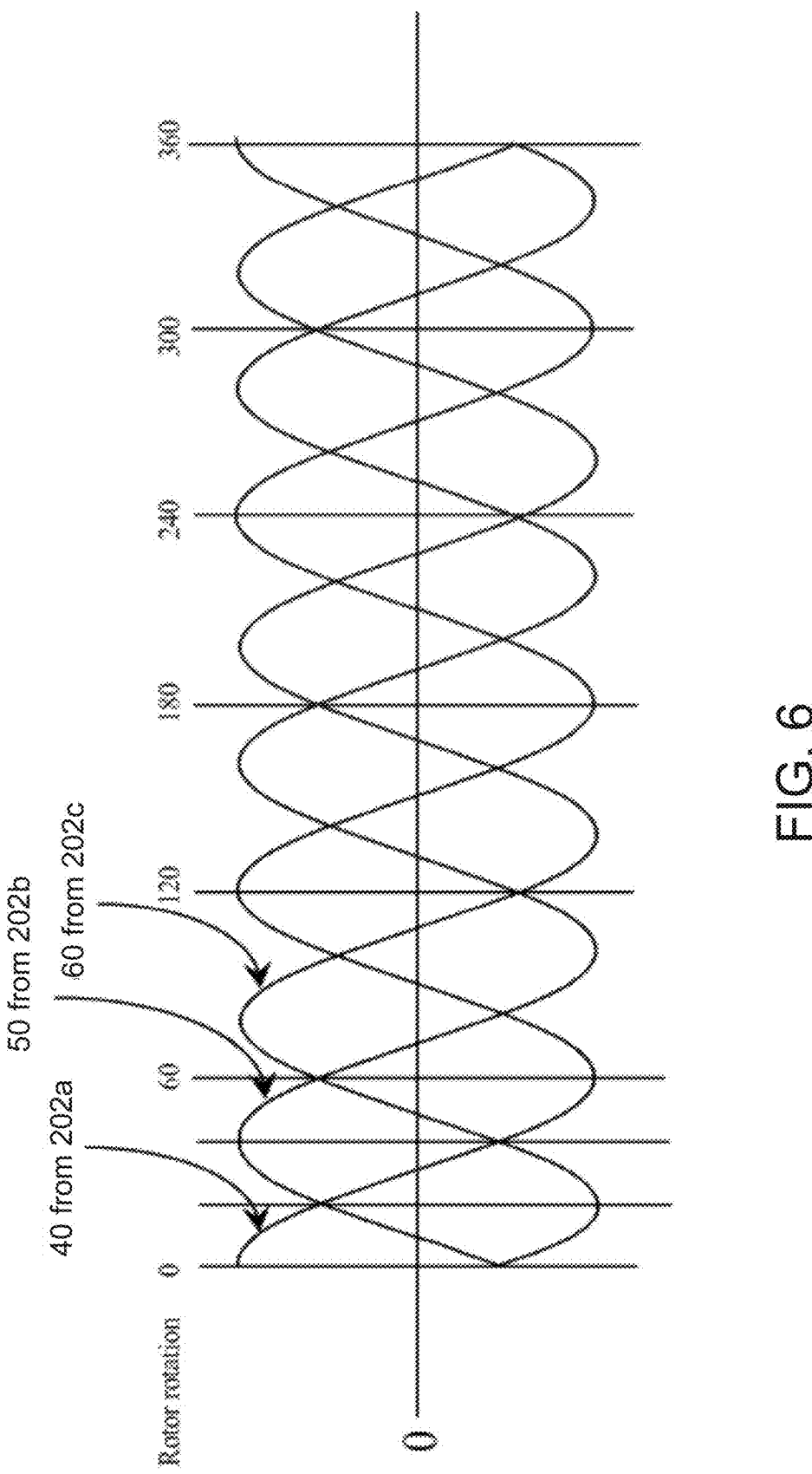
FIG. 6 illustrates a sinusoidal variable voltage pattern produced by passage of permanent magnets of a rotor over a third Hall-effect sensor, with the pattern superimposed over the patterns of FIG. 5 from which displacement can be determined in accordance with some embodiments of the invention.

FIG. 6 illustrates a substantially noise free sinusoidal variable voltage pattern 60 produced by passage of permanent magnets 106 of rotor 104 over Hall-effect sensor 202c, with the 60 pattern superimposed over the 40 and 50 patterns of FIG. 5. As Hall-effect sensor 202c is positioned at an arc length of 40 degrees from the position of Hall-effect sensor 202b, sinusoidal pattern 50 is phase-shifted by 120 degrees from that of sinusoidal pattern 40. The patterns repeat for each of the electrical cycles comprising the 360 degree rotation of the rotor. As can be seen, each of the signals is offset such that the signals can be combined by utilizing a transformation matrix for determination of displacement despite any inaccuracy associated with an individual signal due to electrical cycle harmonics or other cyclical factor.

In some embodiments, the approaches described herein provide for a high degree of accuracy and precision for mechanisms driven by motor 100. In the non-limiting example described above using an 11-bit ADC, the motor position can be controlled to 0.0005 degree mechanical.

Coupled with gear reduction extremely fine control of translation and rotation of mechanisms can be attained. In some embodiments, motor 100 is coupled to a translation drive for a syringe-pump unit to take in and expel fluid in an analytical chemical processes.

Figure 7:
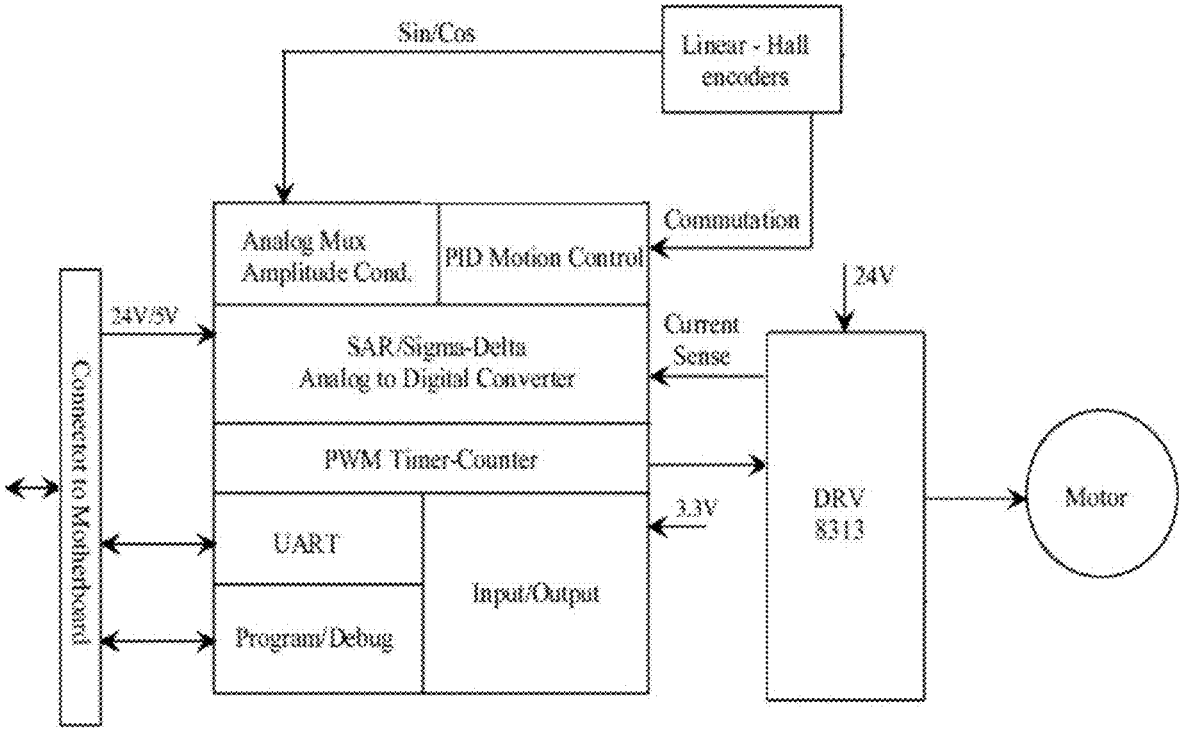
FIG. 7 is a diagram depicting circuitry in an exemplary embodiment of the invention for controlling a DC motor using output of the Hall-effect sensors.

FIG. 7 is a diagram depicting circuitry in one embodiment of the invention for controlling motor 100 using the output of the Hall-effect sensors and the unique method of processing the signals from the phase-separated curves produced by the sensors by utilizing a transformation matrix as described above. Output of the Hall-effect sensors 202a, 202b is provided to a proportional-integral-derivative (PID) motion control circuitry for commutation purpose, and the waveforms produced by interaction of the rotor magnets with the Hall-effect sensors is provided to multiplexer circuitry as shown in FIG. 9. In some embodiments, displacement of the motor can be determined by processing two or more sinusoidal curves of the voltage signals measured by two or more sensors of the motor.

Figure 8:
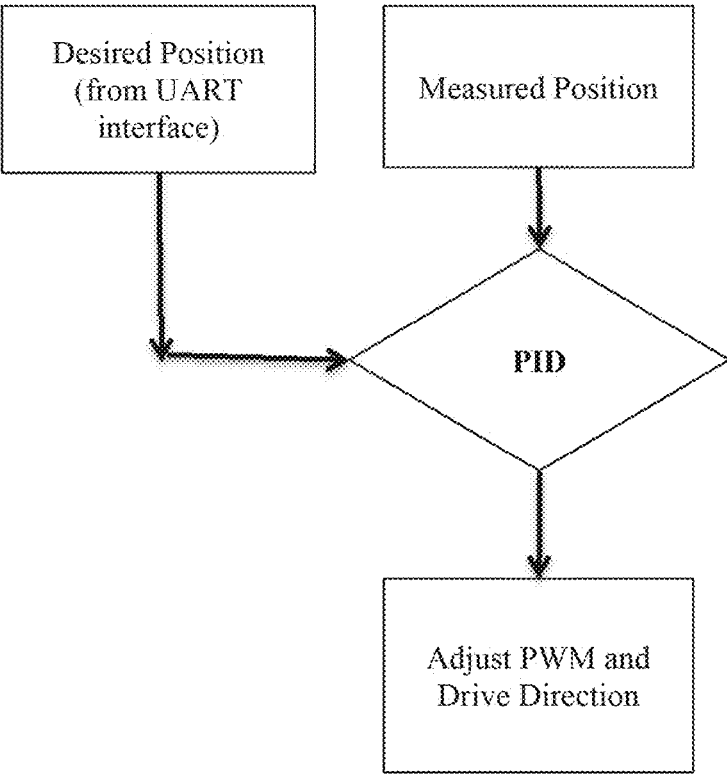
FIG. 8 is a control schematic using PID control to control PWM and drive direction of a motor mechanism.

FIG. 8 is a control schematic depicting control over adjusting a Pulse-width-modulation (PWM) and drive direction of a motor by use of a PID controller. The PID controller incorporates the difference between a desired commanded position of the motor displacement and the measured position. The difference in these inputs is commonly referred to as the following error. While in conventional devices, the measured encoder position is provided by a hardware encoder or position-based sensor, in some embodiments, this input can be provided by the measured voltages from the analog sensors without requiring use of any hardware sensor or position-based sensor. Thus, the approach described herein allows for determination of an input that is conventionally provided by a hardware encoder, without otherwise altering the control configuration. It is appreciated, however, that a processing unit would be adapted to determine the encoder position input.

FIG. 9 illustrates a method in accordance with some embodiments. The method includes: Operating a DC motor having a rotor with permanent magnets distributed about an outer periphery and a stator having a magnetic core. During operation of the motor, the system receives an analog sinusoidal signal from each of at least two analog sensors in a fixed position relative the stator, the sensors being spaced apart from each other such that the sinusoidal signals are offset from each other. The system can include multiple analog sensors, such as Hall-effect sensors, distributed uniformly along at least a portion of the motor's rotational path. In some embodiments, such a configuration includes at least three such sensors separated by about 40 degrees from each other, as shown in FIG. 3A. The system then determines a displacement of the motor based on the sinusoidal signals by processing the multiple signals utilizing a transformation matrix, in accordance with the approach described above. The displacement of the motor can be used by the system to inform various other processes or functions of the system, or can be used to control the motor by use of a control loop which includes the motor displacement as an input to a controller, such as a PID controller. In some aspects, this approach can be used to facilitate or fine-tune operation of a small scale valve mechanism or a syringe drive mechanism in a diagnostic assay system or other such fluid processing system.

In some cases, the above algorithms may not be suited for operation on a simple microprocessor. In some embodiments, the algorithms utilize a look-up table combined with a Newton-Raphson or equivalent iterative numerical solution. This can be implemented as a simple subroutine call in a PSoC processor having a floating point implementation. An alternative approach of utilizing only substantially the linear portions of the sinusoidal signals, such as the centroid approach described in U.S. Pat. No. 10,348,225 entitled "Encoderless Motor with Improved Granularity and Methods of Use" issued Jul. 9, 2019, utilizes only involves multiplication and division such that it can be implemented in simpler microprocessors where more complex facilities are not possible.

As described above in the non-limiting exemplary embodiments, an ADC is used to produce the division of the straight portions of the phase-separated waveforms and motor 100, which can be driven by, for example, a DRV83 13 Texas Instruments motor driver circuit. It is understood that there are other arrangements of circuitry that might be used while still falling within the scope of this approach. In some embodiments the circuitry and coded instructions for sensing the Hall-effect sensors and providing motor encoding may be implemented in a programmable system on a chip (PSOC) on the PCB.

Figure 10:
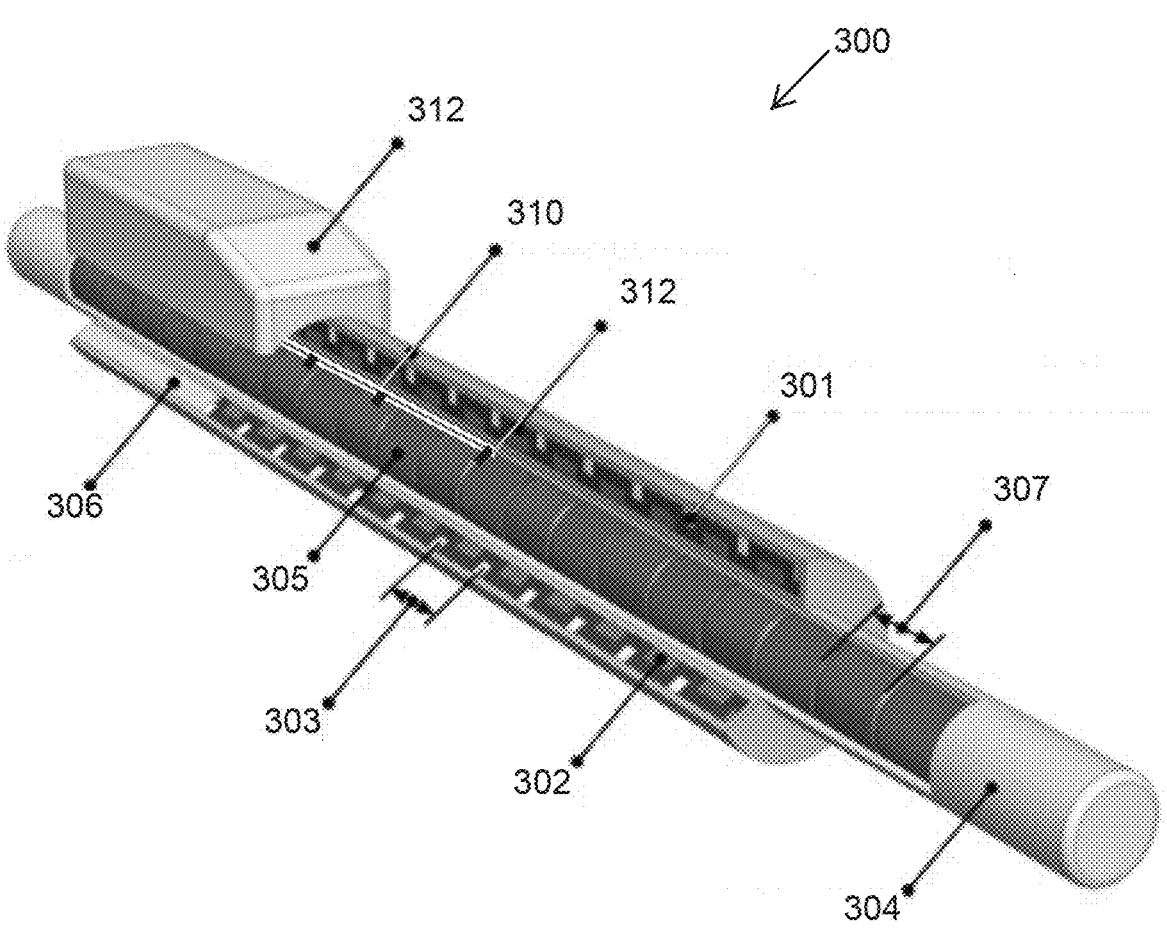
FIG. 10 illustrates a linear motor with integrated sensor encoder in accordance with some embodiments of the invention.

FIG. 10 illustrates the concepts described herein applied to a linear motor. In this example, the linear motor 300 includes an elongated cylindrical stator 301 and a movable translator 304 that moves back and forth through the stator in a linear manner. The stator has a series of electromagnetic coils 302 that are distributed linearly within. The cylindrical translator 304 has a series of alternating permanent magnets 305 that effect back-and-forth movement of the translator upon selective activation of the electromagnetic coils of the stator by the control unit 312 having a processor therein. Movement of the translator is facilitated by one or more bearings 306. The spacing of the permanent magnets is referred to as the pole pitch 307, which corresponds to the spacing of the electromagnetic coils referred to as the slot pitch 303. The linear motor 300 further includes multiple magnetic field sensors 312 (e.g. Hall Effect sensors) that are disposed on a stationary support element 310 that remains stationary with the stator to detect the magnetic field of the permanent magnets of the translator. In this embodiment, there are three sensors 312 spaced apart and positioned so that a gap between the sensors and the permanent magnets is less than a gap between the coils of the stator and the permanent magnets. This allows the signal (e.g. voltage measurement) from each of the sensors to be substantially without noise and/or without saturation so that multiple signals can be processed to determine displacement by utilizing a transformation matrix, as described above, to allow for accurate determination of the displacement of the translator.

It is appreciated that a variety of alterations can be made in the embodiments described herein without departing from the scope of the invention. For example, electric motors of different designs might be incorporated and controlled in alternative embodiments of the invention by placement of sensors to generate substantially sinusoidal phase-separated waveforms in a manner that the circuitry takes into account only the substantially straight portions of the resulting, intersecting curves, with additional resolution provided by dividing the straight portions into equal length segments, effectively dividing the voltage increments into equal known segments to be associated with fractions of rotor or stator rotation, depending on mechanical design of the motor.

Some non-limiting exemplary uses and applications for a DC electric motor according to the invention include the following:

Diagnostic applications: With increasing use of robotics for use in high-throughput processing of fluid samples and performing of diagnostic assays, high resolution control of mechanical mechanisms has become extremely useful. Particularly, as diagnostic devices have trended toward small-scale and microdevices, which are more efficient and require smaller sample sizes, control over small-scale movements is of particular interest.

Medical applications: With increasing use of robotics for remote surgery techniques, extremely well controlled movement of remotely controlled implements have become essential. For example, in ophthalmology or neurology procedures where manipulation of retinal cells or nerve endings require movements with microscopic resolution. In order to effect these movements, which are far finer than is possible with a human hand with eye coordination, computers are used to move actuators in concert with feedback from suitable sensors. A motor with high resolution positional encoding capabilities as disclosed herein can assist the computer, and therefore the surgeon, in performing these delicate procedures.

Semiconductor fabrication: Systems for fabrication of semiconductor devices rely on fine movement of the silicon wafer and manipulator arms. These movements are regulated by means of positional feedback. A motor with high resolution positional encoding capabilities as disclosed herein suitable in these applications.

Aerospace and satellite telemetry: High resolution angular position feedback can be used for precise targeting and for antenna positioning. In particular, satellite communication antenna dishes need to precisely track orbiting satellites. Satellite trajectory combined with precise angle feedback from a motor as described herein mounted to the antenna and power spectrum from the antenna can assist precise tracking. In addition, because the motor as described herein is small, inexpensive and robust, it is an ideal choice for use on satellites and in other extra-terrestrial applications that will be well known to persons of skill in the art.

Remote controlled vehicles: the small size and reduced cost of the motor disclosed herein makes it desirable for use in remote controlled vehicle applications, including drones. In particular the high resolution positional encoding features of the motor make it ideal for steering (directional control) and acceleration (power control) in both commercial and recreational uses of remote controlled vehicles. Additional uses will be apparent to persons of ordinary skill in the art.

Human Augmentation: The small size and reduced cost of the motor disclosed herein makes it desirable for use in prosthetic, orthotic or humanoid applications as these might be applied to augment or substitute for leg, arm or hand mechanics.

Further to the above, the skilled person will be aware that there are a variety of ways that circuitry may be arranged to provide granular control for a motor thusly equipped and sensed. The invention is limited only by the claims that follow.

What is claimed is:

1. An n-phase encoder for use in a mechatronic system, the encoder comprising:

a movable element that applies a magnetic field with period, S, the period representing a total displacement;

a stationary support with n magnetic field sensors mounted thereon and positioned on the stationary support so as to measure the magnetic field imparted by the movable element, wherein n is greater than 1; and a processor communicatively coupled to the n magnetic field sensors and configured to determine displacement of the movable element based on n signals from the n magnetic field sensors by processing the n signals utilizing a transformation matrix;

wherein the processor is configured to process the n signals from the n sensors by:

computing a sine and cosine of the field angle, ϕ, by pre-multiplying an n-by-1 vector by a 2-by-n mathematical transformation matrix, M; and computing the field angle, ϕ, as $\phi=\tan^{-1}(\sin(\phi),\cos(\phi))$.

2. The encoder of claim 1, wherein the total displacement is $2\pi$ radians of a field angle ϕ.

3. The encoder of claim 1, where S is a rotary displacement.

4. The encoder of claim 1, where S is a linear displacement.

5. The encoder of claim 1, wherein the mathematical transformation matrix, M, is configured such that calculation of the field angle, ø, is independent of an amplitude and bias of the magnetic field sensors.

6. The encoder of claim 1, wherein each of the n signals is offset such that the n signals are combined by utilizing the transformation matrix.

7. The encoder of claim 1, wherein the processor is configured to:

store a runout represented by a spatially-varying signal representing a difference between a true field angle and a sensed field angle and utilizes the runout to compensate for the difference thereby removing any runout error.

8. The encoder of claim 1, where the encoder is utilized in a BLDC motor configured for operation of a mechatronic system within a diagnostic assay system.

9. The encoder of claim 8, wherein the mechatronic system of the diagnostic assay system comprises any of: a syringe, valve, cartridge loading or door mechanism.

10. The encoder of claim 6, where the magnetic field sensors are uniformly distributed within the period, S.

11. The encoder of claim 1, wherein the displacement is determined from a combination of n signals by utilizing the transformation matrix thereby obviating any inaccuracies associated with each individual signal due to electrical cycle harmonics or other cyclical factors.

12. The encoder of claim 1, wherein the processor is configured to determine the displacement within a resolution of about 0.01 degrees of mechanical rotation or higher.

13. A processing method comprising:

providing an n phase encoder of a mechatronic system that includes a movable element that applies a magnetic field with period, S, the period representing a total displacement, and a stationary support with n magnetic field sensors mounted thereon and positioned on the stationary support so as to measure the magnetic field imparted by the movable element, wherein n is greater than 1;

obtaining signals from the n magnetic field sensors corresponding to the measurements of the magnetic field imparted by the movable element; and processing n signals from the n magnetic field sensors by utilizing a transformation matrix to determine a displacement of the movable element, wherein the total displacement is 2x radians of a field angle ϕ;

wherein processing the signals from the n sensors comprises:

computing a sine and cosine of the field angle, ϕ, by pre-multiplying an n-by-1 vector by a 2-by-n mathematical transformation matrix, M; and computing the field angle, ϕ, as $\phi=\tan^{-1}(\sin(\phi),\cos(\phi))$.

14. The processing method of claim 13, wherein the processing comprises normalizing an amplitude of at least one of the signals from the n magnetic field sensors to an arbitrary value.

15. The processing method of claim 14, wherein processing of the signals further comprises subtracting respective one or more signal biases from one or more signals from the n magnetic field sensors before a normalization operation.

16. The processing method of claim 15, wherein processing further comprises storing in memory or outputting to the mechatronic system, one or more signal bias coefficients.

17. The processing method of claim 13, where S is a rotary displacement.

18. The processing method in claim 13, where S is a linear displacement.

19. The processing method in claim 13, wherein processing n signals comprises processing only a substantially linear portion(s) of the signals.

20. The processing method of claim 13, wherein the displacement is determined from a combination of n signals utilizing the transformation matrix, thereby obviating any inaccuracies associated with each individual signal due to electrical cycle harmonics or other cyclical factors.

21. The processing method of claim 13, further comprising:

calibrating then signals for magnitude, offset and phase by utilizing the transformation matrix in order to combine the n signals to determine displacement.

22. The processing method of claim 1, wherein each of the n signals is offset such that the n signals are combined by utilizing the transformation matrix.

23. An n-phase encoder for use in a mechatronic system, the encoder comprising:

a movable element that applies a magnetic field with period, S, the period representing a total displacement;

a stationary support with n magnetic field sensors mounted thereon and positioned on the stationary support so as to measure the magnetic field imparted by the movable element, wherein n is greater than 1; and a processor communicatively coupled to the n magnetic field sensors and configured to determine displacement of the movable element based on n signals from the n magnetic field sensors by processing the n signals utilizing a transformation matrix;

wherein the system is configured such that the applied magnetic field is represented by a sum of first and at least one of higher-order harmonics.

24. An n-phase encoder for use in a mechatronic system, the encoder comprising:

a movable element that applies a magnetic field with period, S, the period representing a total displacement;

a stationary support with n magnetic field sensors mounted thereon and positioned on the stationary support so as to measure the magnetic field imparted by the movable element, wherein n is greater than 1; and a processor communicatively coupled to the n magnetic field sensors and configured to determine displacement of the movable element based on n signals from the n magnetic field sensors by processing the n signals utilizing a transformation matrix;

wherein the processor comprises an analog to digital converter of 11 bits or lower.

* * * * *